(12) United States Patent
Balakrishnan et al.

(10) Patent No.: US 10,819,767 B2
(45) Date of Patent: Oct. 27, 2020

(54) INFORMATION CENTRIC NETWORK FOR CONTENT DATA NETWORKS

(71) Applicant: Intel Corporation, Santa Clara, CA (US)

(72) Inventors: Ravikumar Balakrishnan, Hillsboro, OR (US); Venkatesan Nallampatti Ekambaram, Hillsboro, OR (US); Srikathyayani Srikanteswara, Portland, OR (US); Maruti Gupta Hyde, Portland, OR (US); Vallabhajosyula S. Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,176

(22) Filed: Dec. 28, 2018

(65) Prior Publication Data

US 2019/0158622 A1    May 23, 2019

Related U.S. Application Data

(60) Provisional application No. 62/716,178, filed on Aug. 8, 2018.

(51) Int. Cl.
*H04L 29/06* (2006.01)
*H04L 29/08* (2006.01)

(52) U.S. Cl.
CPC .......... *H04L 65/80* (2013.01); *H04L 67/2852* (2013.01); *H04L 67/327* (2013.01); *H04L 65/102* (2013.01); *H04L 67/18* (2013.01); *H04L 67/28* (2013.01); *H04L 67/2885* (2013.01); *H04L 67/322* (2013.01)

(58) Field of Classification Search
CPC ..... H04L 65/80; H04L 65/102; H04L 67/322; H04L 67/18; H04L 67/28; H04L 67/2885
See application file for complete search history.

(56) References Cited

U.S. PATENT DOCUMENTS

| | | | |
|---|---|---|---|
| 2015/0039784 A1* | 2/2015 | Westphal | H04L 45/306 709/240 |
| 2015/0120833 A1* | 4/2015 | De Foy | H04L 67/1097 709/204 |
| 2020/0036814 A1* | 1/2020 | Muscariello | H04L 65/80 |

* cited by examiner

*Primary Examiner* — Kyung H Shin
(74) *Attorney, Agent, or Firm* — Schwegman Lundberg & Woessner, P.A.

(57) ABSTRACT

System and techniques for information centric network (ICN) implemented content data networks (CDNs) are described herein. A directive to initiate a cache operation for content may be received at a gateway of an ICN. An interest packet may be constructed based on the directive. The interest packet may be transmitted on the ICN and a response to the interest packet received. Here, the response has a payload that corresponds to the content. The payload then may be cached at a local repository of the gateway.

24 Claims, 10 Drawing Sheets

INFORMATION CENTRIC NETWORK FOR CONTENT DATA NETWORKS

CLAIM OF PRIORITY

This patent application claims the benefit of priority, under 35 U.S.C. § 119, to United States Provisional Application Ser. No. 62/716,178, titled "INFORMATION CENTRIC NETWORK FOR CONTENT DATA NETWORKS" and filed on Aug. 8, 2018, the entirety of which is hereby incorporated by reference herein.

TECHNICAL FIELD

Embodiments described herein generally relate to computer networking and more specifically to information centric network (ICA) adaptions for content data networks (CDNs).

BACKGROUND

As more and more content is consumed over networks, CDNs have emerged to organize that content for efficient delivery to consumers. Generally, CDNs are organized such that versions (e.g., caches) of content are co-located to consumers. These caches manage likely consumer content requests with deployment footprints and expense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
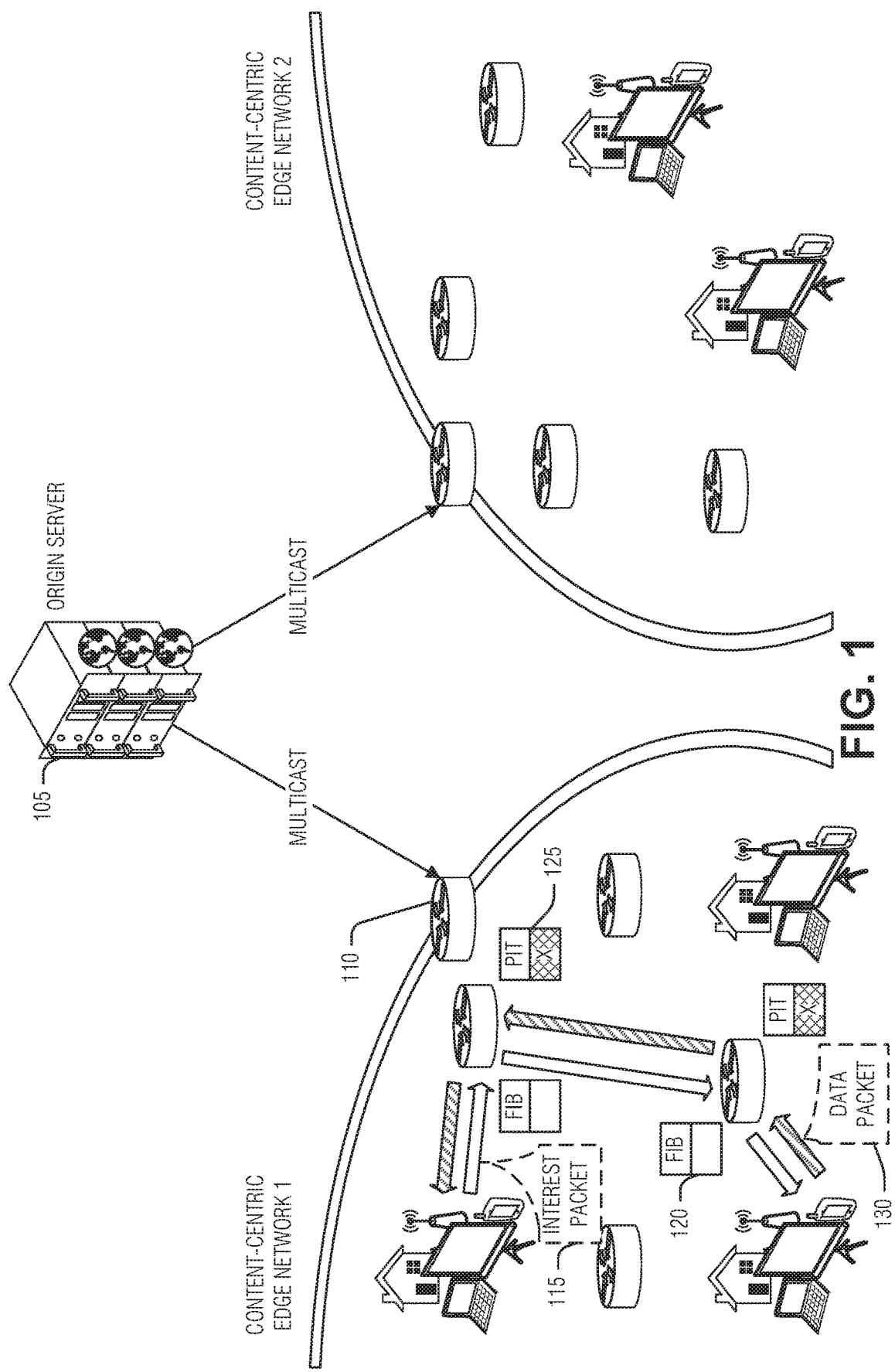
FIG. 1 illustrates an example CDN and ICN environment, according to an embodiment.

ICN is a networking paradigm—several details of which are provided below with respect to FIG. 11—providing benefits to modern communications that have tended to be data centric rather than connection centric. Thus, ICNs are a natural fit to improve CDNs. For example, consider primetime content-distribution. Deep caching, using distributed Content Distribution Networks (CDNs) or even nano-level CDNs—where content may be cached closer to the users such as small neighborhood or even on set-top-boxes—is becoming a popular approach to overcome network congestion and bandwidth limits. An issue is the need to deploy such distributed or nano-CDNs deep in the network. This may involve significant costs and scalability issues over time. ICN in-network caching provides a scalable way to move contents within a CDN network.

The distributed CDNs and nano-CDNs may have several challenges. For example, in-network caching is not supported. Reliance on current Internet Protocol (IP) based network architecture often limits network-level caching and hence seamless sharing. These networks may require specialized CDN services or subscriptions. That is, CDN functionality and support at gateways (e.g., through specialized hardware or software provided by service provider or telecom operator) may require specialized application services or subscriptions. Further, these networks may not support lateral sharing of content (e.g., east-west movement). Thus, consumers with similar content-usage pattern may not take advantage of caching or delivering contents for each other. Additionally, these networks tend to employ push-based caching of primetime contents. Here, service providers use analytics to guess the popular content to cache and may not always reflect the user's actual interest.

To address these issues, intelligent caching in the network layer—including routers, home gateways, and other end-devices—may be used. Edge networks implement an "in-network" caching (e.g., from edge node all the way to the home gateways or set-top boxes) for this purpose that enables scalable content delivery at the edge. An example implementation are ICNs. This type of intelligent in-network caching also allows a seamless peer-to-peer sharing of content allowing east-west (peer-to-peer) content movement in addition to the north-south (server-client) movement. This may reduce the burden on the backbone network by reducing the number of unicast content requests to a remote server. In addition, the quality of experience (QoE) or codec bitrate may also be improved since the end-to-end flow of the video is only dependent on the end consumers' network speeds.

A "pull" based technique may be used where the primetime content is explicitly requested by a user and is then delivered quickly due to caching of that content at one or more nearby "in-network caching" enabled gateways or network routers. The technique takes advantage of the fundamental idea of embedding content within network at the routers and gateway devices to allow seamless sharing of the content among the network devices (home gateways in this case). This process results in several advantages. For example, pull-based content caching, where caching is performed based on interest requests from specific end-consumer's home gateways leading to efficient caching. Further, advantages include predictive publishing of interest, where analytics may be used to further publish interests in the network allowing popular content to be pre-fetched and make it accessible across the network. Further advantages may include seamless sharing with peer network and gateway nodes, where interest packets are issues in the network and any node (peer, router or a higher-level gateway) may respond with the content based on its cache. Additionally, true "deep-caching" may be realized where the entire network is capable of caching contents, thereby, improving the reliability and Quality of Service (QoS) of content delivery.

Another issue with content delivery includes delivering content within a network efficiently to provide highest quality of experience for end users while reducing strain on network bandwidth of an operator or a service provider; and improving in-network caching efficiency. The number of unicast requests from consumers to the CDN edge may lead to large latency and strain on network bandwidth. This impact is amplified during primetime hours due to a lot of content movement between consumer and edge. One approach to address this issue is to cache contents at home gateways. This is done either by extending CDN functionality to home gateways or caching contents at home gateways and network nodes (e.g., routers, gateways, etc.) within a CDN edge network through ICN and taking advantage of in-network caching and peer-to-peer access of data Such approaches may mitigate network load and improve user experience for popular content, but the non-popular content traffic exhibit a "long-tailed" behavior which makes it harder to solve merely by caching.

To address this issue of long-tail content, a hierarchical network coded ICN may be used. Here, intermediate nodes may perform network-coded communication both for data requests as well as content delivery based on their proximity to the CDN edge. This approach offers great flexibility by providing variable-level coded caching within the network and enables rapid movement of both popular and non-popular content seamlessly. The inherent broadcast nature of ICN networks also helps in accessing information through multiple interfaces, enabling nodes to transmit and receive parallel coded packets and assemble them on the fly.

The above approach differs from previous approaches because the edge devices do not have to explicitly support the CDN, as is the case for end-point caching. Further, in conventional approaches, sophisticated protocols are required between these end devices in order to achieve the benefits. Additionally, the end users' devices only passively influence how coding is performed across the servers. To elaborate, coding will be decided centrally at the server based on content popularity in the geographic area covered by the server (edge CDN) and may result in too much redundancy, thereby increasing the overall bandwidth usage.

In contrast, the ICN network coding uses a hierarchical network coding to cache as well as to request contents. The ICN provides inherent caching capabilities in the network nodes. Typically, ICN caching policies have timers that expire after which the cache is discarded. New caching policies may be used at intermediate nodes to use different expiry timers for popular (or unpopular) contents. By performing network coding intelligently to distribute contents across the network and requesting network coded content and choosing the degree of network coding several benefits accrue. For example, inherent in-network caching capability arising from the information-centric network architecture; and rapidly increased data availability and reduce latency by the use of network coding across contents to allow fast movement of data within the network. In an example, this may be facilitated by an interest-table based coded packet request and coded packet delivery and caching to reduce overall caching load and network bandwidth.

In an example, support for both regular nodes that may not perform network coded transmission or reception as well as network-coding capable nodes is provided. This way, the burden on the end users' devices which only need to operate as a regular node in the information-centric network. In an example, a hierarchical network coding may be employed, where the nodes closer to CDN edge perform network coding across large amounts of data while the nodes closer to end users' devices perform network coding across a small amount of data. In an example, intra-content and inter-content network coding capability may be used to enable greater flexibility and easy access of data.

FIG. 1 illustrates an example CDN and ICN environment, according to an embodiment. In this architecture, the content service provider 105 or telecom operator may deploy a network with "in-network" caching capability (e.g., an ICN) as part of its edge network with an edge node 110 that has content from primetime content providers. In an example, the edge node 110 may be a service provider-owned or operator owned (e.g., controlled) CDN node that has cached the contents to be served within its edge network. In this case, the service provider 105 may cache contents at the CDN edge node 110 and deploy "in network caching" within its network and subscribers. The home gateways or set-top boxes that are within the service provider's network are capable of network layer caching and routing of primetime contents.

In an example, content owners (OTTs) may subscribe to several CDN services which are cached by the service provider at an edge node 110. The edge network of the service provider may then implement "in-network caching" starting from the edge node down to the home gateways subscribed to its network. The requesting party (for example, an OTT application on server 105) may use its API to indicate its request to its home gateway that is connected to the internet and that exists within this edge network. The illustrated environment includes in-network caching using content stores at network nodes including routers, gateways, home gateways for seamless peer-to-peer sharing of primetime content. The home gateway may publish an interest packet tagging it with the content name indicated by the OTT application.

Generation of the interest packet 115 may take several forms. Architectures such as ICN provide hooks to define an interest in content. However, several different techniques to define interest packets 115 for optimal performance may be employed. For example, an end-user device application initiated technique may include an end users' device sending an interest request 115 based on the content of interest using the API with the application layer. In another example, a strategic "super-node" initiated technique may be used. Here, the super nodes request popular primetime content in a predictive fashion to pre-fetch popular contents within the network ahead of time in order to conserve peak-hour traffic even within the edge network.

Both of these techniques may use data analytics to determine the popular content within the edge network. As interest packet 115 propagates in the network, the routers remember the interface from which the interest request arrived and forward this interest packet with the help of a lookup in its local Forwarding Information base 120 (FIB).

A FIB 120 is used to provide a quick way to map the interest packets' name to the outgoing interfaces. It helps routing incoming interest packets 115 towards the source of content. The interest packet 115 may traverse several nodes, where the FIBs 120 are populated by a name-based routing protocol enabling propagation of the interest packet 115 until it eventually finds another node that has the desired content cached. This node may be a peer home gateway 110 in another location, a router, or another node that is part of the information-centric edge network. Thus, in contrast to the traditional networks where the content requests typically flow upstream, in the illustrated network, the interest 115 may flow laterally from one home gateway 110 to another where content may be available, potentially realizing lower latency.

The interests 115 may be forwarded based on several criteria. Example forwarding strategies may include a forwarding strategy where the interest packet 115 is more likely to find cached content, to enable fast retrieval of content, or follow a least congested path while still finding the content within the needed time. In an example, the forwarding mechanism may use knowledge of the caching methods described later to determine the next interface and strategy to forward.

When the interest packet 115 reaches a node with the content, a data packet 130 is sent in return. The data packet 130 includes both the primetime content name as well as the content itself. In addition, a signature is included with the producer's key. The data packet 130 follows a reverse path taken by the interest packet 155 in order to get back to the requesting home gateway from which the OTT specific API may be used to deliver the content to the requesting OTT 105.

As several interest packets 115 (and therefore contents) are received at intermediate home gateways or routers, these nodes maintain a Pending Interest Table (PIT) 125 where the interests 115 are waiting until a data packet 130 is received in response. Each interest packet 155 is stored in the PIT 125 if a node does not have the data cached or a corresponding PIT entry is not found. If a PIT entry is found matching an interest 115, it means the interest 115 was already forwarded, hence avoiding duplicate forwarding of interests. The PIT 120 may be used in different ways. For example, participating home gateways, routers, or other intermediate nodes may cache the content requests in its PIT 120 and implicitly avoid duplicate requests by forwarding the interest packets 115 with the same data request only once, thereby conserving network bandwidth. In an example, participating home gateways, if not already caching contents requested by other home gateways, may cache the contents in their local content store (e.g., memory, storage, etc.) in an on-demand basis, thereby accelerating popular content dissemination among home gateways. This is also particularly useful if there is content that would be of interest to a certain geographic neighborhood like a local university sports events, local news events etc.

Caching within the network may be triggered by an interest packet 115 requesting a popular primetime content. In addition, the edge network may logically partition the network into user groups based on different policies. For example, geographical proximity—based on a metric such as "hop-count" or round-trip time (RTT) for proximity may be used; logical-proximity—where a distributed hash table may be used to form user groups; or a combination of geographical and logical proximity. Here, content may be cached either in a distributed fashion or with the help of a super-node for the group of users based on the interest requests.

The following operations may be employed in the illustrated Architecture for content delivery. Macro-scale edge nodes 110 may cache prime-time video obtained through multicast from the content server 105. For example, prime-time videos involve popular television (TV) series, live news, sports events etc. These may belong to any OTT application and other IP based prime time video contents. Each of these edge nodes 110 may serve local edge-networks that comprise gateways, routers, smart home-gateways, smart TVs, mobile devices, etc. These edge-networks implement in-network caching for content dissemination. In an example, each of these end devices (e.g., smart home-gateways, routers, smart TVs, etc.) is capable of caching content.

The participating nodes implement forwarding tables (e.g., FIB 120) and pending-interest tables (e.g., PIT 125) to track interest packets 115 and cache the data packet responses 130 to the interest packets 115. The interest packet 115 may be generated by an end node based on its own local interest. Alternatively, a super-node 105 that resides in the network may pool the requests or generate popular interests based on tools including data analytics, a learning engine, etc.

A node that requests data sends the interest packet 115 to its local gateway 110 with the content name and format as defined above. The interest packet 115 is propagated inside the network using the information in the FIB 120. The interest packet 115 stops at a node that has the data 130 and is routed back to the source node using the same path of the interest packet 115. Note that any node having the data is a destination and need not be known to the source since the data is referred by its name and is not associated with any IP address. In an example, each of the nodes in the route stores the named entity in its cache depending on the local storage available. Here, any new requests for the same data (as in the case of prime-time videos) would be served by the closest node thereby reducing the load on the network and latencies. Because the data is not decoded by any of the intermediate nodes, the protocol is independent of the OTT application. This then implements all the functionalities offered by a nano-CDN network while eliminating its drawbacks.

Figure 2:
FIG. 2 illustrates an example of an interest packet, according to an embodiment.

FIG. 2 illustrates an example of an interest packet, according to an embodiment. Interest packet format. Communication is initiated through an interest packet that indicates the need for popular primetime content. This triggers caching of contents in the network layer. Users request for specific primetime content using the NDN architecture. This is initiated by sending an interest packet which has the illustrated format. The content name may be the content that the requestor is interested in. For example, this may be a popular sports event/nba/2017/finals.xyz where xyz is the format of the content (such as mpg., etc.). The names may be globally unique or may be based entirely on local context but are unique within a given namespace.

Figure 3:
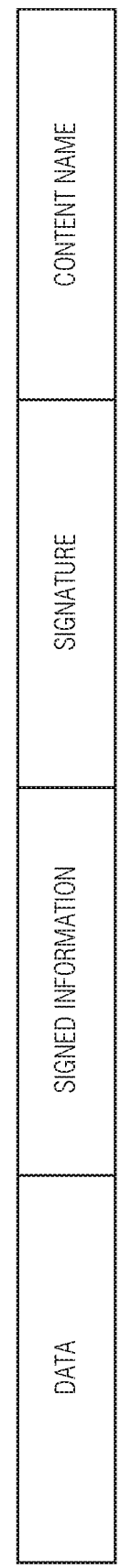
FIG. 3 illustrates an example of a data packet, according to an embodiment.

FIG. 3 illustrates an example of a data packet, according to an embodiment. The data packet includes the requested data, signed information (e.g., a hash of the data for integrity checking), a signature of the provider (e.g., a digital certificate), and the content name. The content name may be different (e.g., more specific) than the name used in the interest packet.

Figure 4:
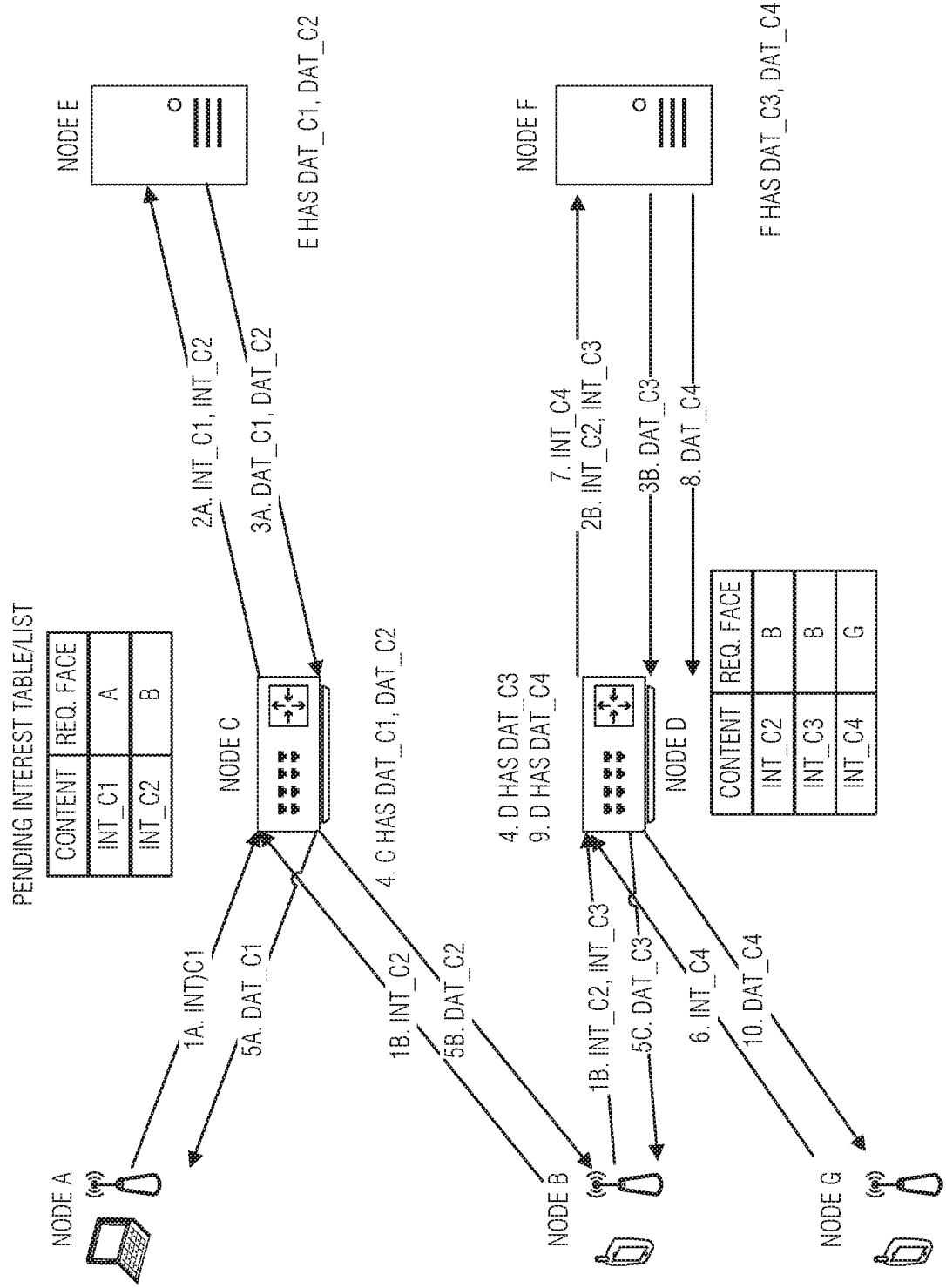
FIG. 4 illustrates an example of an ICN data exchange without network coding, according to an embodiment.

FIG. 4 illustrates an example of an ICN data exchange without network coding, according to an embodiment. First, the following types of nodes in the network may be:

Type 1: Simple ICN nodes that may send regular interest packets and data packets. These nodes are typically the end users' devices that may send simple content requests to the network and may only read the data that is not network-coded.

Type 2: Network-coding capable ICN nodes that may send network coded interest packets and network coded data packets as well as regular data packets.

The data flow of a network without applying network coding is illustrated in FIG. 4. In this example, the end Nodes A and B send interest packets corresponding to contents of interest (C1 for Node A) and (C2 and C3 for Node B). The Nodes C and D, upon receiving the interest packets for contents, update their interest list or table with the requested information, requesting node and forward the interest packets to their neighbor nodes E and F correspondingly. Upon receiving the data packets for C1 and C2 at Node C and for C3 at Node D, Nodes C and D forward the data packets to Nodes A and B along the same route.

When a new request for data C4 arrives at Node G, the Node G will again forward the interest packet to its neighbor Node F which has the Content C4. Hence the Content C4 is returned to Node G through data packet transmission from Node F→D and D→G. The corresponding timing diagram of these interactions is illustrated in FIG. 5.

Figure 5:
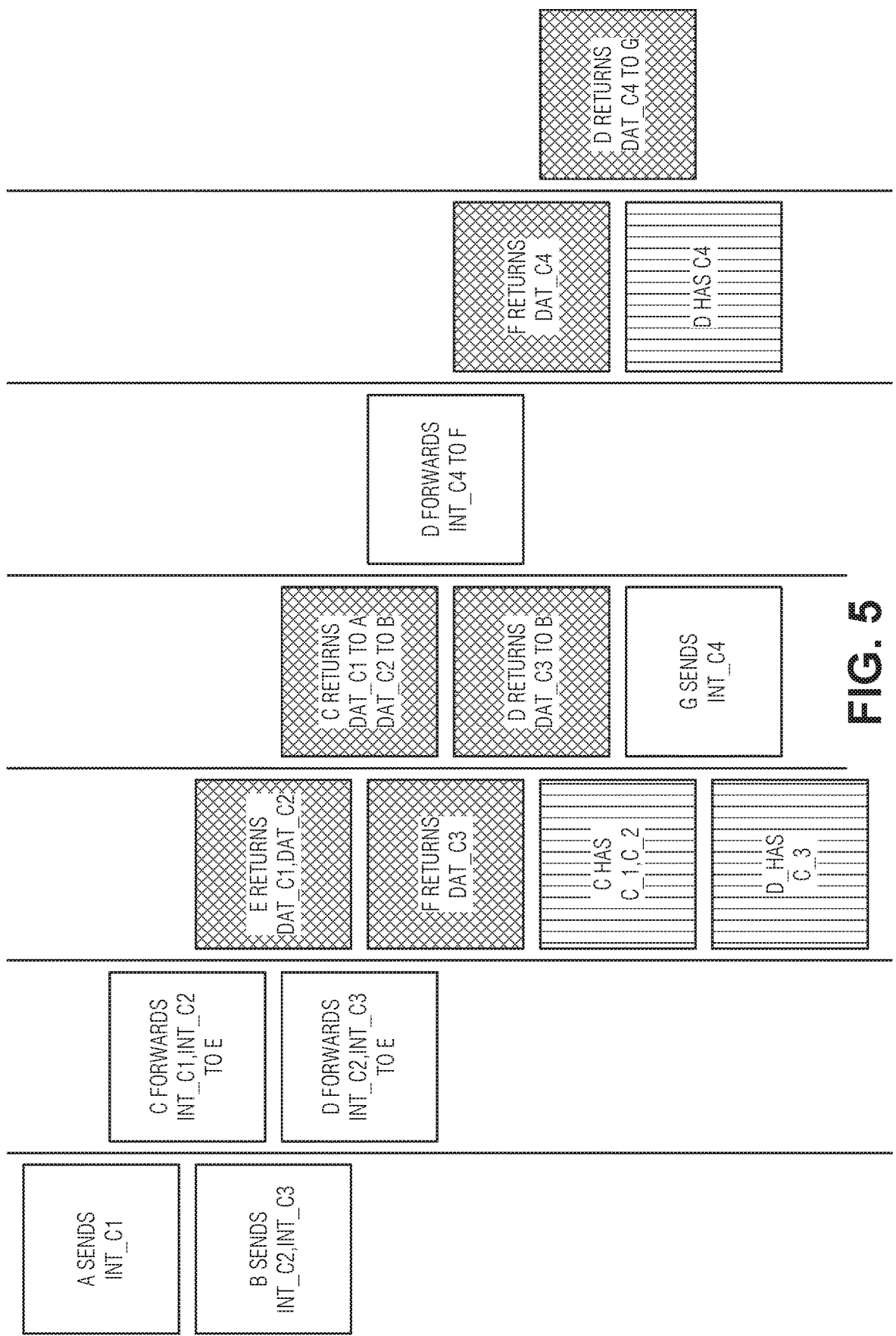
FIG. 5 illustrates an example of timing in an ICN data exchange without network coding, according to an embodiment.

FIG. 5 illustra.tes an example of timing in an ICN data exchange without network coding, according to an embodiment. The unshaded boxes represent a request or forward, the cross shaded boxes represent a return (e.g., data packet), and the vertically shaded boxes represent possession of the data. Time moves from left to right with each column representing a time-step.

Figure 6:
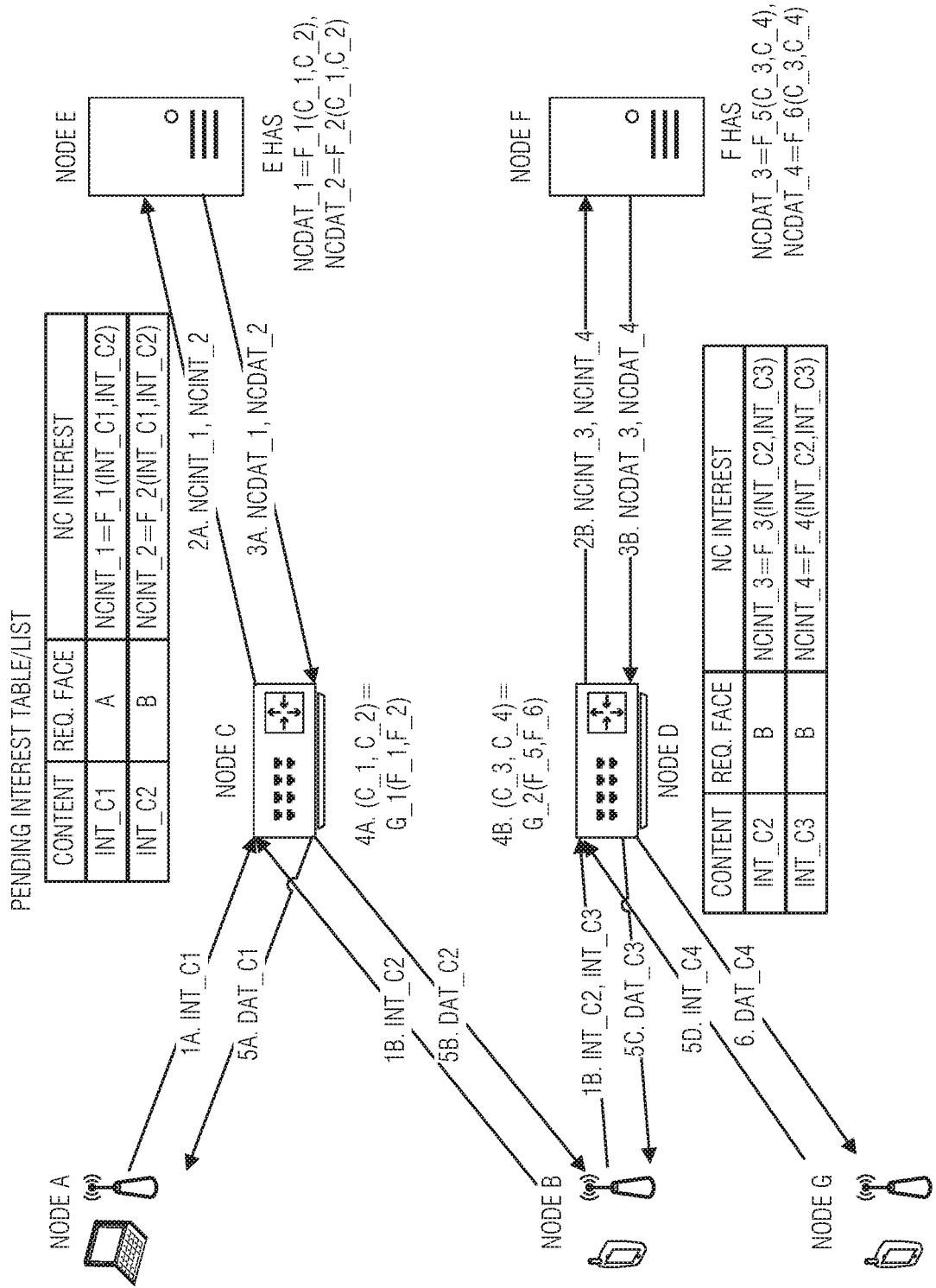
FIG. 6 illustrates an example of an ICN data exchange with network coding, according to an embodiment.

FIG. 6 illustrates an example of an ICN data exchange with network coding, according to an embodiment. ICN architectures may be expanded to use network coding in generating an enhanced interest packet (e.g., Network Coded Interest packet (NC interest packet)) as well as in delivering and caching of network coded contents or data at the network nodes. In order to effectively build the network-coded interest packets, the pending interest table or list as well as the network node location in the network (e.g., proximity to the edge) are incorporated. Example components may include:

1. The number of combinations in the NC interest packet generated at a network node may be determined by how far the node is from the CDN edge. The nodes closest to the CDN edge may perform network coding across several combinations since these nodes will be catering data transmissions to a large range of contents. The nodes closest to the end users' devices may perform network coding across few combinations since these nodes will be interfacing with very few end users' devices and may not have to burden with a heavy network coding leading to large latency or high complexity.
2. The combinations within the NC interest packet are generated based on the interest table. For example, if a network node receives several interests for contents C1, C2 and C3 (e.g., pending in the interest list), the node may compose a network coded interest packet for contents C1, C2 and C3. The node may also indicate the order of preference of the content in the coded request. For example, if C1 has a short-expiry of interest, the node may indicate the priority for C1.
3. Network coding of data may be performed based on the network coded interest packets and a node's own interest table. A node that receives a new request for contents C1, C2, C3 may perform coding of contents across C1, C2 and C3 or any subset of the combinations. The priority index may also be utilized to determine the weights of the coded packet generated as well as the components. It is important to perform coding across the same combinations with different coefficients to ensure independent coded streams.
4. The suitable NC data packet sent as a response to an NC interest packet is identified based on the combinations identified in the NC interest packet as well as the coefficients. It is important again to send independent NC data packets for the same combinations to ensure that it may be decoded.

An example of the proposed technique is illustrated in FIG. 6. As in FIG. 4, the Node A requires Content C1 and Node B requires Content C2 and C3. Here, Node C constructs network coded interest packets $NC1=f_1(int_{C1}, int_{C2})$ and $NC2=f_1 (Int_{C1}, Int_{C2})$ as functions of the interested contents in the pending interest table. Similarly, the Node D constructs network coded interest packets $NCInt_3=f_3(Int_{C2}, Int_{C3})$ and $NCInt_4=f_4(Int_{C2}, Int_{C3})$. Node E receives this NC interest packet and may already contain several coded packets in its cache. Alternatively, if it contains raw data, it may perform coding across C1 and C2. In either case, the Node E contains NCData to deconstruct C1 and C2 where $NCData1=f_1(C1, C2)$ and $NCData2=f_2(C1, C2)$. The Node F receives the coded request for C2 and C3 from the NCInt3 and NCInt4 packets. However, Node F only contains data C3 and C4 or the coded combinations for C3 and C4. Since Node F contains at least the NC data for C3, it may send back the network coded packets $NCData3=f_5(C3, C4)$ and $NCData4=f_6(C3, C4)$. The Node C, upon receiving NCData1 and NCData2, may decode the actual data packets C1 and C2. Similarly, Node D may decode packets C3 and C4 from NCData3 and NCData4. The Node C returns data C1 to Node A and C2 to Node B. Similarly, node D returns data C3 to Node B. Later, when a new Node G sends an interest packet for C4 to Node D, since the Node D already contains C4 in coded form, it may directly send this to Node saving network bandwidth and latency that may have resulted from fetching the new data again from Node F. A timing diagram for this example is illustrated in FIG. 7.

Figure 7:
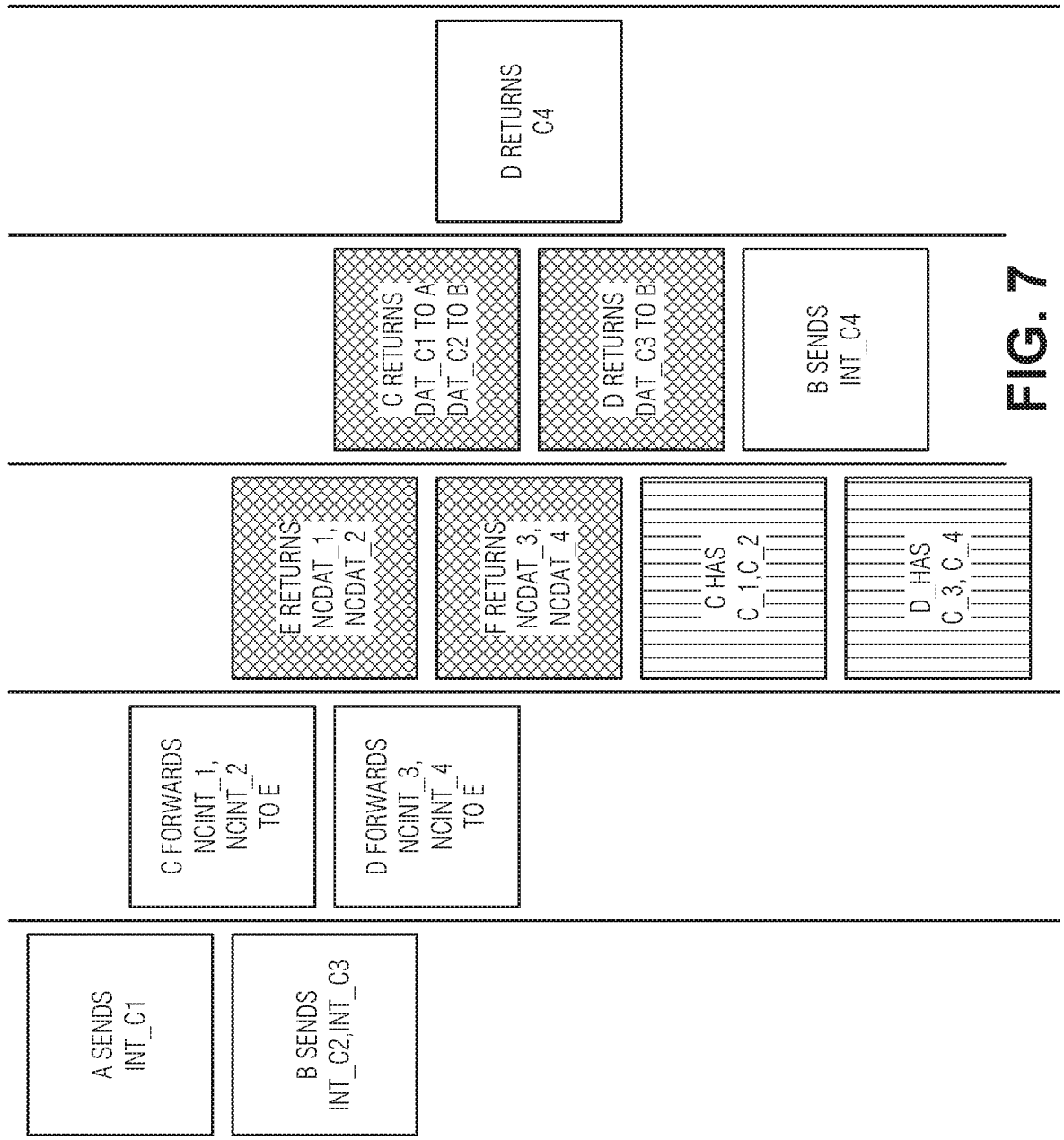
FIG. 7 illustrates an example of timing in an ICN data exchange with network coding, according to an embodiment.

FIG. 7 illustrates an example of timing in an ICN data exchange with network coding, according to an embodiment. As it may be seen by comparing FIG. 7 to NG. 5, the network coding ICN technique may reduce the fetch time for new requests since the previous requests may have already cached coded combinations to generate the newly requested data packets.

Figure 8:
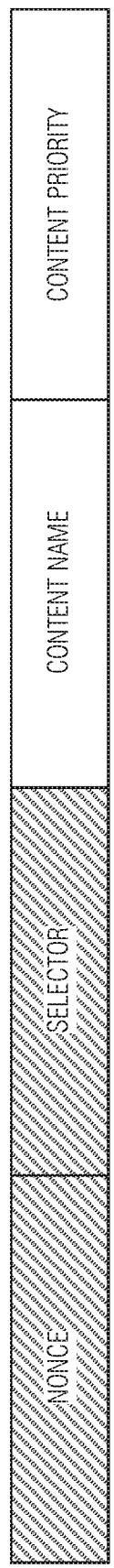
FIG. 8 illustrates an example of a net Tork-coded interest packet, according to an embodiment.

FIG. 8 illustrates an example of a network-coded interest packet, according to an embodiment. This is a high-level packet format of the network coded interest packets. The unshaded fields are new or modified from traditional ICN interest packets. The network-coded interest packet has the same format of a regular interest packet with a few modifications and a new field. The Content Name in the NC Interest Packet is used to indicate the combinations that are sought by the sender. The Content Priority field indicates the coefficients of all content requests or the priority of the content that has higher precedence over other contents in the request, Sending the coefficients explicitly avoids the linear dependency issue of network coding.

Figure 9:
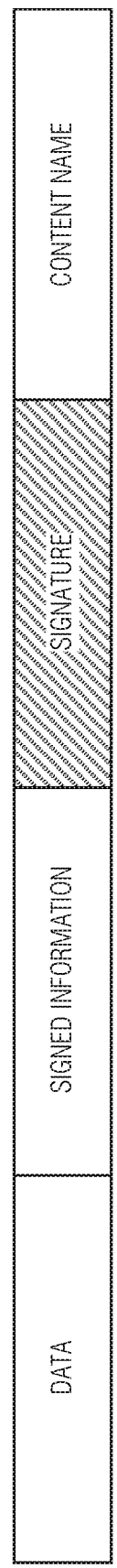
FIG. 9 illustrates an example of a network-coded data packet, according to an embodiment.

FIG. 9 illustrates an example of a network-coded data packet, according to an embodiment. Again, the unshaded fields differ from traditional ICN packets. The network-coded data packet contains the coded content in the Data Field instead of the raw data. Further, the coefficients of the coded transmission may be indicated in the Signed Info field. The Content Name is usually the same as indicated in the Interest Packet. Since the data packets may not contain all the combinations requested in the interest packet, the Signed Info field is used to identify the combinations that are present in the Network-coded data packet.

Figure 10:
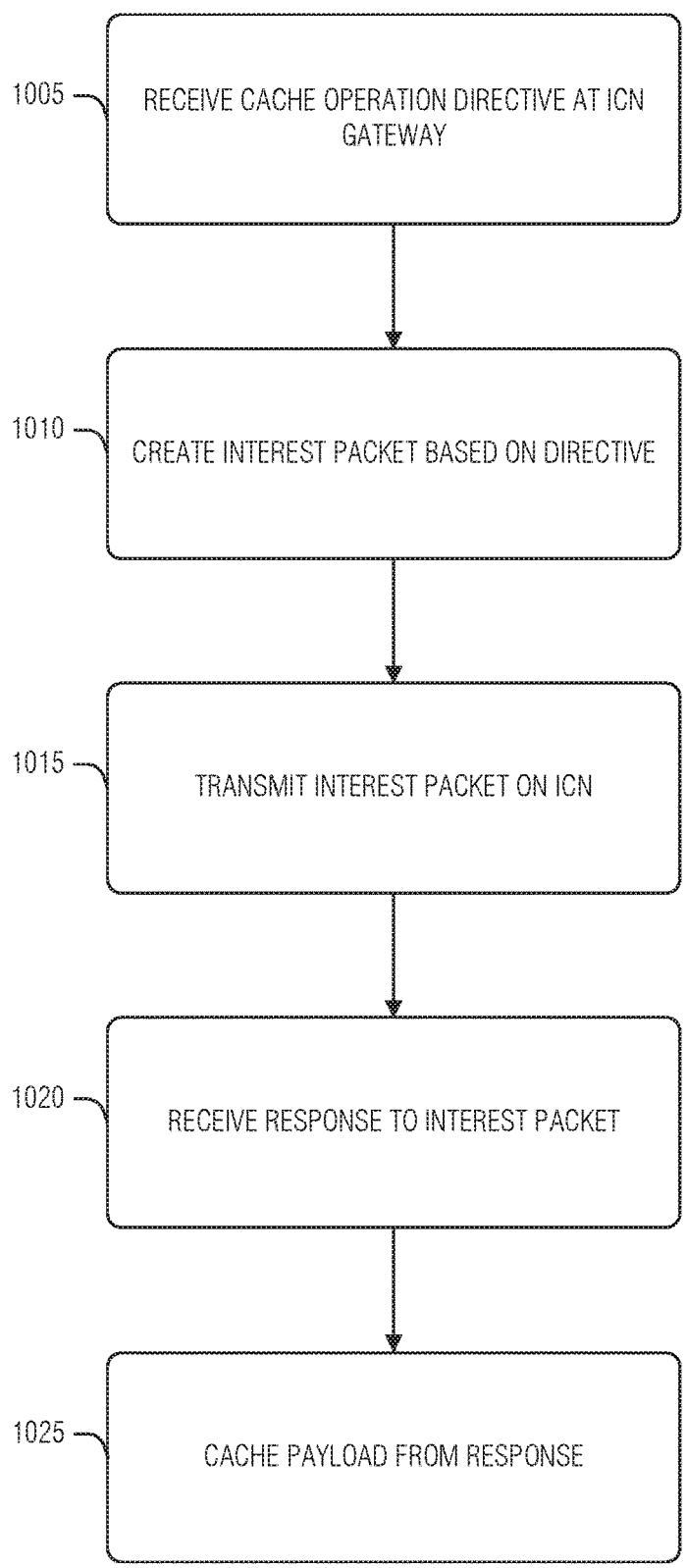
FIG. 10 illustrates a flowchart of an example of a method for an ICN implemented CDN, according to an embodiment.

FIG. 10 illustrates a flowchart of an example of a method 1000 for an ICN implemented CDN, according to an embodiment. The operation of the method 1000 are implemented in computer hardware, such as that described above or below (e.g., processing circuitry).

At operation 1005, a directive to initiate a cache operation for content is received at a gateway of an ICN. In an example, the directive is received out-of-band from the ICN, such as by direct addressing of the gateway. In an example, the directive is a data packet in response to an interest from the gateway. Here, the gateway may subscribe to updates from, for example, a content provider, to determine whether or not to initiate a cache operation. In an example, the directive originates from a content provider. In this example, the content provider controls whether to pre-load content in the ICN via the directive. This may be useful when, for example, a large demand is likely but has not yet happened. Examples of such a scenario may include video content of a sporting event with known viewership characteristics.

In an example, the directive originates from a node of the ICN in response to a metric of interest packets for the content. Here, a node in the ICN may be measuring content requests and determine that demand increases suggest pre-caching certain content will be efficient. The metrics may follow rate of requests (e.g., requests are trending upwards). In either case, the network recognizes a condition in which pre-population of caches for particular content will likely result in less total network traffic.

At operation 1010, an interest packet based on the directive is constructed. The interest packet may name data specified in the directive, or employ a function over time to name the data as covered by the directive. In the last example, the directive may indicate that video content will be divided into one minute segments, and that pre-population should progress by requesting five minutes of content three minutes apart. Thus, the interest packet follows the defined schedule depending upon what has been requested and the current time.

In an example, the interest packet includes a set of content combinations. This example contemplates that the ICN may be using network coding to combine different content pieces into data structures for efficiency of transfer and storage. Thus, the interest packet includes the combinations to indicate which data would be efficiently transferred because different pieces of content will be used by the gateway. In an example, the set of content combinations are in a content name field of the interest packet. In an example, the interest packet includes a content priority field that includes coefficients of the set of content combinations. The coefficients may be used to ascertain which pieces of content in the combination are of a higher priority. This is used in fulfillment when a response will not include all of the data in the combination. The data actually sent will conform to the higher-priority coefficient.

At operation 1015, the interest packet on the ICN.

At operation 1020, a response to the interest packet is received. Here, the response has a payload that corresponds to the content.

At operation 1025, the payload is cached at a local repository of the gateway. In an example, when the directive includes a priority, caching the payload may include evicting material from the local repository in response to the other material having a lower priority than the priority in the directive. Thus, the more relevant material is cached. This may be useful when, for example, a sporting event is followed by an entertainment event (e.g., concert). The sporting event may be over, but its content cached throughout the ICN. The directive includes a priority for the entertainment event that is greater than the sporting event. In this case, the sporting event material is evicted from the cache. In a similar manner, the priority may prevent eviction of the cached material. For example, typically an ICN will cache data based upon when it was received. However, if the event is popular, it would be beneficial to not cache data in order to maintain the cache of the event data. Here, the priority may be used to make this cache determination decision. In an example, the priority is based on time at the gateway and a schedule in the directive. The schedule provides an automatic technique to adjust the priority without a further communication. For example, the data has a priority of A during a first time period (e.g., during the event) and a priority of B (e.g., less than A) during a second time period (e.g., following the event according to the schedule.

In an example, the payload is a network coding of the content and a second content. As noted above, such network coding may have benefits in storage and transmission of the data. In an example, the response includes a signed information field that includes coefficients for content in the payload. In an example, the gateway is in a hierarchy, and wherein the network coding of the payload is dependent upon a position of the gateway in the hierarchy. In an example, the hierarchy is from a network core to a network edge. Here, a number of contents subject to a single network coding decreases from the network core to the network edge. That is, more pieces of content are combined in network coding the closer to the network core one gets. This arrangement recognizes that, the closer to the edge and consumer devices one gets in the network, the less likely that these consumer devices are requesting different content.

Figure 11:
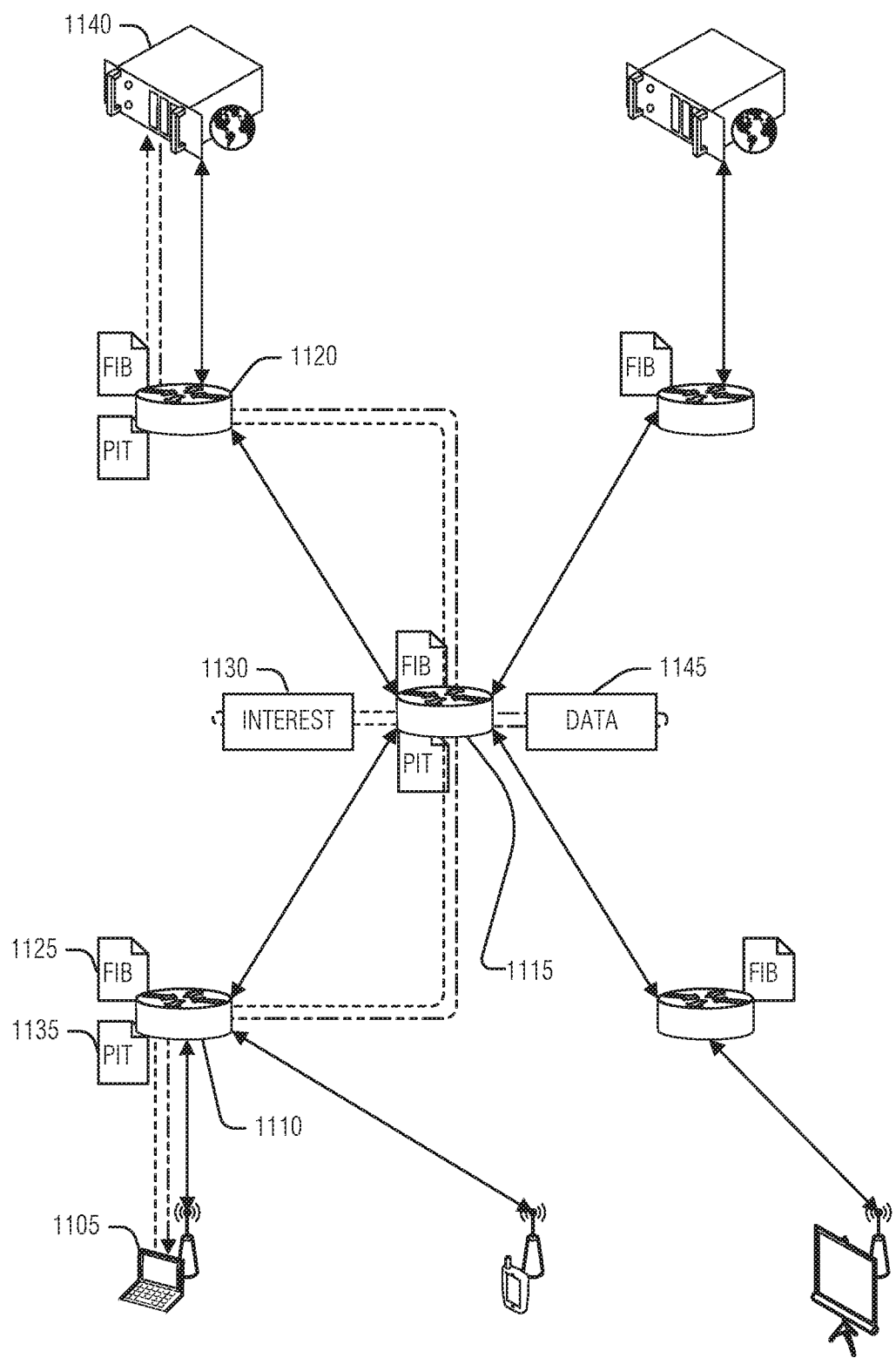
FIG. 11 illustrates an example ICN, according to an embodiment.

FIG. 11 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1105 (e.g., subscriber) requests named content from the network itself. The content request may be called an interest and transmitted via an interest packet 1130. As the interest packet traverses network devices (e.g., network elements, routers, switches, hubs, etc.)—such as network elements 1110, 1115, and 1120—a record of the interest is kept, for example, in a pending interest table (PIT) at each network element. Thus, network element 1110 maintains an entry in its PIT 1135 for the interest packet 1130, network element 1115 maintains the entry in its PIT, and network element 1120 maintains the entry in its PIT.

When a device, such as publisher 1140, that has content matching the name in the interest packet 1130 is encountered, that device 1140 may send a data packet 1145 in response to the interest packet 1130. Typically, the data packet 1145 is tracked back through the network to the source (e.g., device 1105) by following the traces of the interest packet 1130 left in the network element PITS. Thus, the PIT 1135 at each network element establishes a trail back to the subscriber 1105 for the data packet 1145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 11630 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 1130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1130 to data cached in the ICN element. Thus, for example, if the data 1145 named in the interest 1130 is cached in network element 1115, then the network element 1115 will return the data 1145 to the subscriber 1105 via the network element 1110. However, if the data 1145 is not cached at network element 1115, the network element 1115 routes the interest 1130 on (e.g., to network element 1120). To facilitate routing, the network elements may use a forwarding information base 1125 (FIB) to match named data to an interface (e.g., physical port) for the route. Thus, the FIB 1125 operates much like a routing table on a traditional network device.

In an example, additional meta-data may be attached to the interest packet 1130, the cached data, or the route (e.g., in the FIB 1125), to provide an additional level of matching. For example, the data name may be specified as "www-.somedomain.com or videos or v8675309," but also include a version number—or timestatnp, time range, endorsement, etc. In this example, the interest packet 1130 may specify the desired name, the version number, or the version range. The matching may then locate routes or cached data matching the name and perform the additional comparison of meta-data or the like to arrive at an ultimate decision as to whether data or a route matches the interest packet 1130 for respectively responding to the interest packet 1130 with the data packet 1145 or forwarding the interest packet 1130.

ICN has advantages over host-based networking because the data segments are individually named. This enables aggressive caching throughout the network as a network element may provide a data packet 1130 in response to an interest 1130 as easily as an original author 1140. Accordingly, it is less likely that the same segment of the network will transmit duplicates of the same data requested by different devices.

Fine grained encryption is another feature of many ICN networks. A typical data packet 1145 includes a name for the data that matches the name in the interest packet 1130. Further, the data packet 1145 includes the requested data and may include additional information to filter similarly named data (e.g., by creation time, expiration time, version, etc.). To address malicious entities providing false information under the same name, the data packet 1145 may also encrypt its contents with a publisher key or provide a cryptographic hash of the data and the name. Thus, knowing the key (e.g., from a certificate of an expected publisher 1140) enables the recipient to ascertain whether the data is from that publisher 1140. This technique also facilitates the aggressive caching of the data packets 1145 throughout the network because each data packet 1145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 12:
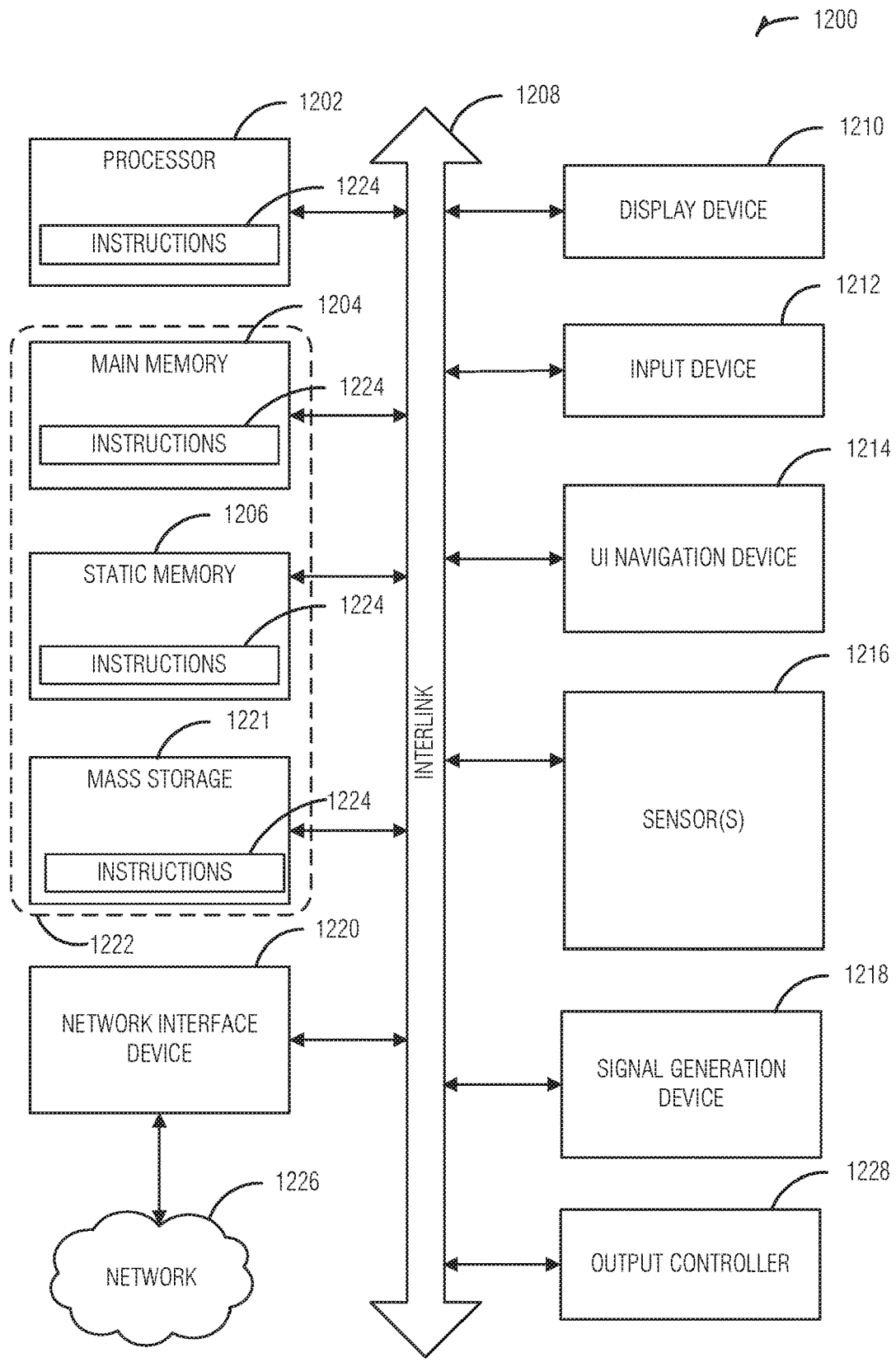
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may perform. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.), In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on machine readable medium 1222 may be representative of the instructions 1224, such as instructions 1224 themselves or a format from which the instructions 1224 may be derived. This format from which the instructions 1224 may be derived may include source code, encoded instructions (e.g., in compressed or encrypted form), packaged instructions (e.g., split into multiple packages), or the like. The information representative of the instructions 1224 in the machine readable medium 1222 may be processed by processing circuitry into the instructions to implement any of the operations discussed herein. For example, deriving the instructions 1224 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1224.

In an example, the derivation of the instructions 1224 may include assembly, compilation, or interpretation of the information (e.g., by the processing circuitry) to create the instructions 1224 from some intermediate or preprocessed format provided by the machine readable medium 1222. The information, when provided in multiple parts, may be combined, unpacked, and modified to create the instructions 1224. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1224 may be further ansmitted or received over a communications network 1226 using a transmission medium via the network interface device 1220 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Additional Notes & Examples

Example 1 is a device for an information centric network (ICN) implemented content data network (CDN), the device comprising: a memory including instructions; and processing circuitry that, when in operation, is configured by the instructions to: receive, at a gateway of an ICN, a directive to initiate a cache operation for content; construct an interest packet based on the directive; transmit the interest packet on the ICN; receive a response to the interest packet, the response including a payload that corresponds to the content; and cache the payload at a local repository of the gateway.

In Example 2, the subject matter of Example 1, wherein the directive includes a priority, and wherein, to cache the payload, the processing circuitry is configured by the instructions to evict material from the local repository in response to the other material having a lower priority than the priority in the directive.

In Example 3, the subject matter of Example 2, wherein the priority is based on time at the gateway and a schedule in the directive.

In Example 4, the subject matter of any of Examples 1-3, wherein the directive originates from a content provider.

In Example 5, the subject matter of any of Examples 1-4, wherein the directive originates from a node of the ICN in response to a metric of interest packets for the content.

In Example 6, the subject matter of any of Examples 1-5, wherein the payload is a network coding of the content and a second content.

In Example 7, the subject matter of Example 6, wherein the gateway is in a hierarchy, and wherein the network coding of the payload is dependent upon a position of the gateway in the hierarchy.

In Example 8, the subject matter of Example 7, wherein the hierarchy is from a network core to a network edge, and wherein a number of contents subject to a single network coding decreases from the network core to the network edge.

In Example 9, the subject matter of any of Examples 6-8, wherein the interest packet includes a set of content combinations.

In Example 10, the subject matter of Example 9, wherein the set of content combinations are in a content name field of the interest packet.

In Example 11, the subject matter of any of Examples 9-10, wherein the interest packet includes a content priority field that includes coefficients of the set of content combinations.

In Example 12, the subject matter of any of Examples 6-11, wherein the response includes a signed information field that includes coefficients for content in the payload.

Example 13 is a method for an information centric network (ICN) implemented content data network (CDN), the method comprising: receiving, at a gateway of an ICN, a directive to initiate a cache operation for content; constructing an interest packet based on the directive; transmitting the interest packet on the ICN; receiving a response to the interest packet, the response including a payload that corresponds to the content; and caching the payload at a local repository of the gateway.

In Example 14, the subject matter of Example 13, wherein the directive includes a priority, and wherein caching the payload includes evicting material from the local repository in response to the other material having a lower priority than the priority in the directive.

In Example 15, the subject matter of Example 14, wherein the priority is based on time at the gateway and a schedule in the directive.

In Example 16, the subject matter of any of Examples 13-15, wherein the directive originates from a content provider.

In Example 17, the subject matter of any of Examples 13-16, wherein the directive originates from a node of the ICN in response to a metric of interest packets for the content.

In Example 18, the subject matter of any of Examples 13-17, wherein the payload is a network coding of the content and a second content.

In Example 19, the subject matter of Example 18, wherein the gateway is in a hierarchy, and wherein the network coding of the payload is dependent upon a position of the gateway in the hierarchy.

In Example 20, the subject matter of Example 19, wherein the hierarchy is from a network core to a network edge, and wherein a number of contents subject to a single network coding decreases from the network core to the network edge.

In Example 21, the subject matter of any of Examples 18-20, wherein the interest packet includes a set of content combinations.

In Example 22, the subject matter of Example 21, wherein the set of content combinations are in a content name field of the interest packet.

In Example 23, the subject matter of any of Examples 21-22, wherein the interest packet includes a content priority field that includes coefficients of the set of content combinations.

In Example 24, the subject matter of any of Examples 18-23, wherein the response includes a signed information field that includes coefficients for content in the payload.

Example 25 is at least one machine readable medium including information representative of instructions for an information centric network (ICN) implemented content data network (CDN), the instructions, when executed by processing circuitry, cause the processing circuitry to perform operations comprising: receiving, at a gateway of an ICN, a directive to initiate a cache operation for content; constructing an interest packet based on the directive; transmitting the interest packet on the ICN; receiving a response to the interest packet, the response including a payload that corresponds to the content; and caching the payload at a local repository of the gateway.

In Example 26, the subject matter of Example 25, wherein the directive includes a priority, and wherein caching the payload includes evicting material from the local repository in response to the other material having a lower priority than the priority in the directive.

In Example 27, the subject matter of Example 26, wherein the priority is based on time at the gateway and a schedule in the directive.

In Example 28, the subject matter of any of Examples 25-27, wherein the directive originates from a content provider.

In Example 29, the subject matter of any of Examples 25-28, wherein the directive originates from a node of the ICN in response to a metric of interest packets for the content.

In Example 30, the subject matter of any of Examples 25-29, wherein the payload is a network coding of the content and a second content.

In Example 31, the subject matter of Example 30, wherein the gateway is in a hierarchy, and wherein the network coding of the payload is dependent upon a position of the gateway in the hierarchy.

In Example 32, the subject matter of Example 31, wherein the hierarchy is from a network core to a network edge, and wherein a number of contents subject to a single network coding decreases from the network core to the network edge.

In Example 33, the subject matter of any of Examples 30-32, wherein the interest packet includes a set of content combinations.

In Example 34, the subject matter of Example 33, wherein the set of content combinations are in a content name field of the interest packet.

In Example 35, the subject matter of any of Examples 33-34, wherein the interest packet includes a content priority field that includes coefficients of the set of content combinations.

In Example 36, the subject matter of any of Examples 30-35, wherein the response includes a signed information field that includes coefficients for content in the payload.

Example 37 is a system for an information centric network (ICN) implemented content data network (CDN), the system comprising: means for receiving, at a gateway of an ICN, a directive to initiate a cache operation for content; means for constructing an interest packet based on the directive; means for transmitting the interest packet on the ICN; means for receiving a response to the interest packet, the response including a payload that corresponds to the content; and means for caching the payload at a local repository of the gateway.

In Example 38, the subject matter of Example 37, wherein the directive includes a priority, and wherein the means for caching the payload include means for evicting material from the local repository in response to the other material having a lower priority than the priority in the directive.

In Example 39, the subject matter of Example 38, wherein the priority is based on time at the gateway and a schedule in the directive.

In Example 40, the subject matter of any of Examples 37-39, wherein the directive originates from a content provider.

In Example 41, the subject matter of any of Examples 37-40, wherein the directive originates from a node of the ICN in response to a metric of interest packets for the content.

In Example 42, the subject matter of any of Examples 37-41, wherein the payload is a network coding of the content and a second content.

In Example 43, the subject matter of Example 42, wherein the gateway is in a hierarchy, and wherein the network coding of the payload is dependent upon a position of the gateway in the hierarchy.

In Example 44, the subject matter of Example 43, wherein the hierarchy is from a network core to a network edge, and wherein a number of contents subject to a single network coding decreases from the network core to the network edge.

In Example 45, the subject matter of any of Examples 42-44, wherein the interest packet includes a set of content combinations.

In Example 46, the subject matter of Example 45, wherein the set of content combinations are in a content name field of the interest packet.

In Example 47, the subject matter of any of Examples 45-46, wherein the interest packet includes a content priority field that includes coefficients of the set of content combinations.

In Example 48, the subject matter of any of Examples 42-47, wherein the response includes a signed information field that includes coefficients for content in the payload.

Example 49 is at least one machine-readable medium including instructions that, when executed by processing circuitry, cause the processing circuitry to perform operations to implement of any of Examples 1-48.

Example 50 is at least one machine-readable storage medium comprising information representative of instructions that, when executed by processing circuitry, cause the processing circuitry to perform the operations of any of Examples 1-48.

Example 51 is an apparatus comprising means to implement of any of Examples 1-48.

Example 52 is a system to implement of any of Examples 1-48.

Example 53 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated, In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for an information centric network (ICN) implemented content data network (CDN), the device comprising:
   a memory including instructions; and
   processing circuitry that, when in operation, is configured by the instructions to:
      receive, at a gateway of an ICN, a directive to initiate a cache operation for content, wherein the gateway is located in a network hierarchy of the ICN, and wherein the network hierarchy extends from a network core to a network edge;
      construct an interest packet based on the directive;
      transmit the interest packet on the ICN;
      receive a response to the interest packet, the response including a payload including a network coding that corresponds to the content, wherein the network coding of the payload is based on a position of the gateway in a level of the network hierarchy; and
      cache the payload at a local repository of the gateway.

2. The device of claim 1, wherein the directive includes a priority, and wherein, to cache the payload, the processing circuitry is configured by the instructions to evict material from the local repository in response to the other material having a lower priority than the priority in the directive.

3. The device of claim 1, wherein the directive originates from a content provider.

4. The device of claim 1, wherein the directive originates from a node of the ICN in response to a metric of interest packets for the content.

5. The device of claim 1, wherein the payload is a network coding of the content and a second content.

6. The device of claim 5, wherein a number of contents subject to a single network coding decreases from the network core to the network edge.

7. The device of claim 5, wherein the interest packet includes a set of content combinations.

8. The device of claim 1, wherein the ICN is configured to provide caching of the payload among the gateway and additional nodes at the level of the network hierarchy, to enable the gateway and the additional nodes to laterally transfer the content at the level of the network hierarchy.

9. A method for an information centric network (ICN) implemented content data network (CDN), the method comprising:
   receiving at a gateway of an ICN, a directive to initiate a cache operation for content, wherein the gateway is located in a network hierarchy of the ICN, and wherein the network hierarchy extends from a network core to a network edge;
   constructing an interest packet based on the directive;
   transmitting the interest packet on the ICN;
   receiving a response to the interest packet, the response including a payload including a network coding that corresponds to the content, wherein the network coding of the payload is based on a position of the gateway in a level of the network hierarchy; and
   caching the payload at a local repository of the gateway.

10. The method of claim 9, wherein the directive includes a priority, and wherein caching the payload includes evicting material from the local repository in response to the other material having a lower priority than the priority in the directive.

11. The method of claim 9, wherein the directive originates from a content provider.

12. The method of claim 9, wherein the directive originates from a node of the ICN in response to a metric of interest packets for the content.

13. The method of claim 9, wherein the payload is a network coding of the content and a second content.

14. The method of claim 13, wherein a number of contents subject to a single network coding decreases from the network core to the network edge.

15. The method of claim 13, wherein the interest packet includes a set of content combinations.

16. The method of claim 9, wherein the ICN is configured to provide caching of the payload among the gateway and additional nodes at the level of the network hierarchy, to enable the gateway and the additional nodes to laterally transfer the content at the level of the network hierarchy.

17. At least one non-transitory machine readable medium including information representative of instructions for an information centric network (ICN) implemented content data network (CDN), the instructions, when executed by processing circuitry, cause the processing circuitry to perform operations comprising:
   receiving, at a gateway of an ICN, a directive to initiate a cache operation for content, wherein the gateway is located in a network hierarchy of the ICN, and wherein the network hierarchy extends from a network core to a network edge;
   constructing an interest packet based on the directive;
   transmitting the interest packet on the ICN;
   receiving a response to the interest packet, the response including a payload including a network coding that corresponds to the content, wherein the network coding of the payload is based on a position of the gateway in a level of the network hierarchy; and
   caching the payload at a local repository of the gateway.

18. The at least one machine readable medium of claim 17, wherein the directive includes a priority, and wherein caching the payload includes evicting material from the local repository in response to the other material having a lower priority than the priority in the directive.

19. The at least one machine readable medium of claim 17, wherein the directive originates from a content provider.

20. The at least one machine readable medium of claim 17, wherein the directive originates from a node of the ICN in response to a metric of interest packets for the content.

21. The at least one machine readable medium of claim 17, wherein the payload is a network coding of the content and a second content.

22. The at least one machine readable medium of claim 21, wherein a number of contents subject to a single network coding decreases from the network core to the network edge.

23. The at least one machine readable medium of claim 21, wherein the interest packet includes a set of content combinations.

24. The at least one machine readable medium of claim 17, wherein the ICN is configured to provide caching of the payload among the gateway and additional nodes at the level of the network hierarchy, to enable the gateway and the additional nodes to laterally transfer the content at the level of the network hierarchy.

* * * * *